UNITED STATES PATENT OFFICE.

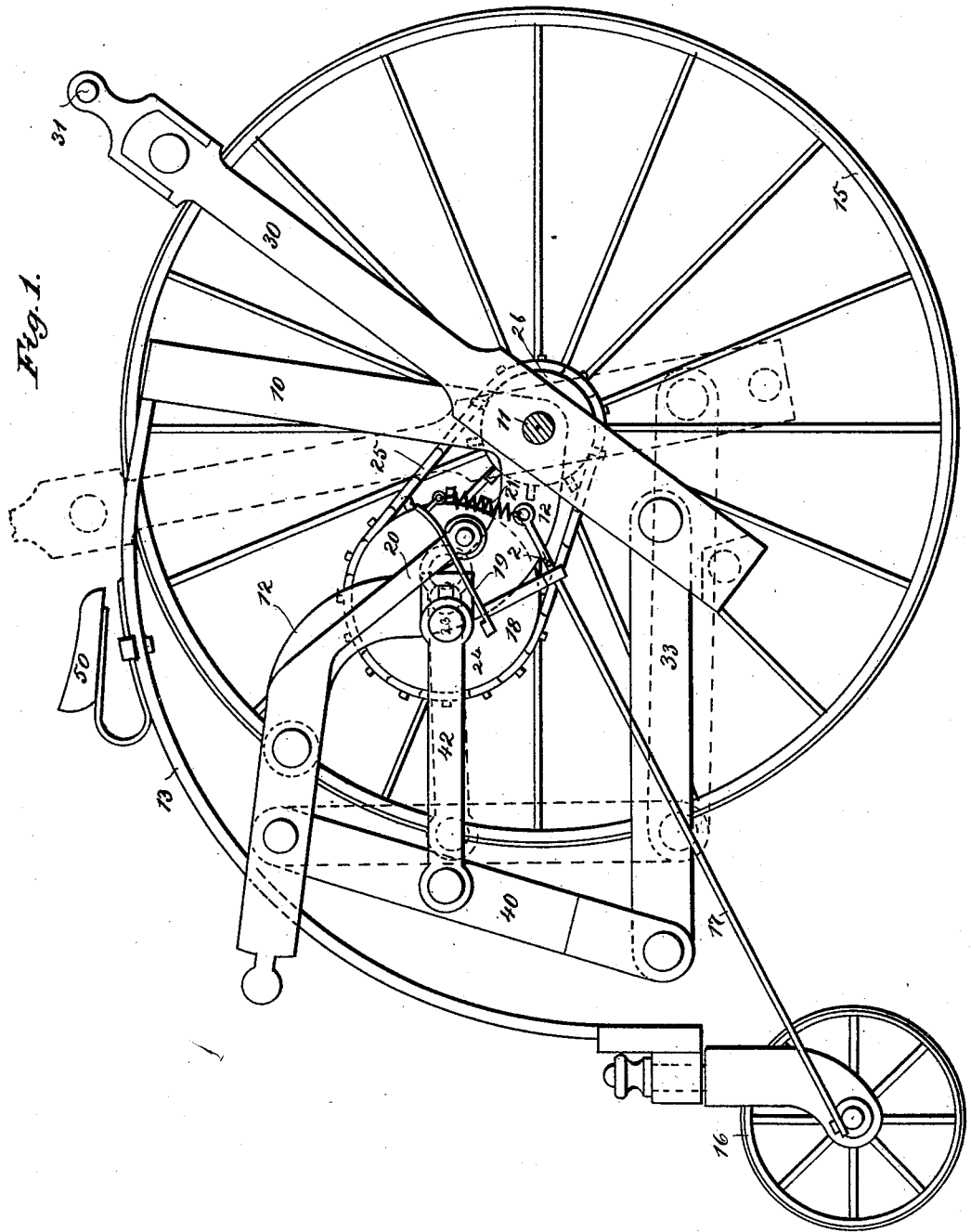

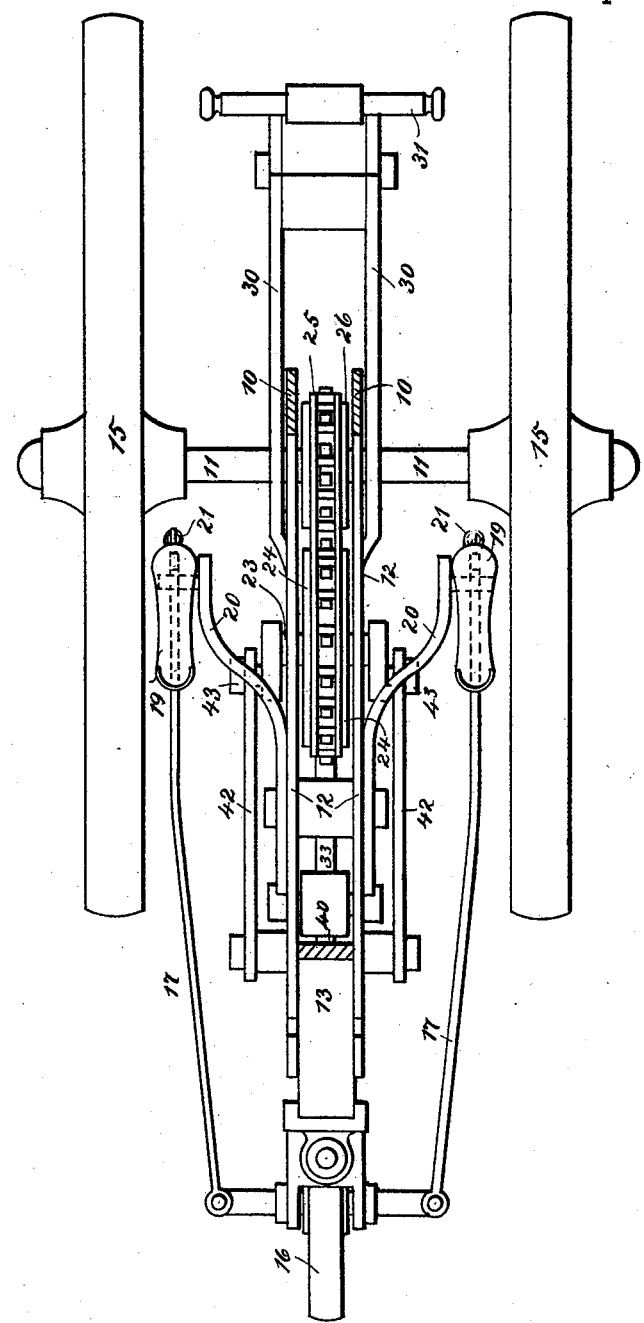

CLARENCE P. HOYT, OF CAÑON CITY, COLORADO.

VELOCIPEDE.

SPECIFICATION forming part of Letters Patent No. 424,986, dated April 8, 1890.

Application filed July 11, 1889. Serial No. 317,156. (No model.)

*To all whom it may concern:*

Be it known that I, CLARENCE P. HOYT, of Cañon City, in the county of Fremont and State of Colorado, have invented new and Improved Apparatus for Propelling Vehicles, of which the following is a full, clear, and exact description.

The object of this invention is to provide for the rapid driving of a vehicle of the class wherein the motive power is supplied by the occupant or rider, a further object being to provide an exceedingly stable, strong, and durable vehicle; and to the ends above named the invention consists of certain novel constructions, arrangements, and combinations of elements to be hereinafter more fully described, and specifically pointed out in the claims.

Reference is to be had to the accompanying drawings, forming a part of this specification, in which similar figures of reference indicate corresponding parts in both the views.

Figure 1 is a side view of a vehicle representing the same as it appears when provided with my improved driving attachment, the right-hand wheel of the vehicle being removed and the axle shown in section, and the driving apparatus being represented as it appears when the operating-lever is upon the full forward stroke. Fig. 2 is a sectional plan view on line $x$ $x$ of Fig. 1.

In the construction shown in the drawings above referred to the main rigid frame of the machine is made up of two upwardly-extending bars 10, through which the axle 11 passes. To the bars 10 there are connected upwardly and rearwardly extending bars 12, or the bars 12 and 10 might be integral, and to the bars 10 and 12 there is connected a backbone 13, as clearly shown.

The wheels 15 are keyed to the axle 11, and to the lower end of the backbone there is connected a caster-wheel 16, to the bracket of which wheel I connect upwardly and forwardly extending rods 17, that pass through downwardly-extending and slotted arms 18, that are secured to pedals 19, said pedals in turn being pivotally connected to arms 20, that are bolted to the bars 12. In advance of the arms 18 the rods 17 carry stops 2, and the forward ends of the rods are connected to the forward ends of the pedals by spiral springs 21, as is clearly shown in the drawings.

The bars 12 serve as bearings for a crank-shaft 23, upon which there is keyed a sprocket-wheel 24, said wheel being engaged by a belt or chain 25, that runs in engagement with a small sprocket-wheel 26, carried by the axle 11 between the bars 10.

Just outside of the bars 10, I mount lever-bars 30, said bars being fulcrumed on the axle 11 and connected at their upper ends, and to the connected upper ends of the lever-bars 30, I secure a hand-piece 31. To the downwardly-extending sections of the lever-bars 30 is connected a rod 33, the rear end of said rod being in turn connected to a lever-bar 40, the upper end of which is pivotally mounted between the bars 12 and the lower end of the lever-bar 40 being bifurcated to receive the rear end of the connecting-rod 33. Connecting-rods 42 extend from the lever-bar 40 to the wrist-pins 43, that are carried by the crank-arms of the shaft 23.

From the construction above set forth it will be seen that if a reciprocating motion be imparted to the lever 30 the lever 40 will be rocked and the crank-shaft 23 turned, and as the crank-shaft is so turned the machine will be driven forward.

In operation the rider sits upon the saddle 50 and places his feet upon the pedals 19, his hand grasping the hand-piece of the lever 30, when by moving the lever 30 forward and backward the machine may be driven, a perfect control of the machine being secured, owing to the connection between the caster-wheel bracket and the pedals 19, the construction being such that if the right-hand pedal be depressed the vehicle will be guided to the right, and vice versa, the depressing of a pedal drawing upon one of the rods 17 and acting to turn the caster-wheel, as will be readily understood.

Now, although I have illustrated and described a vehicle adapted for ordinary road use, I desire it to be distinctly understood that by certain slight changes, such as would suggest themselves to the ordinary mechanic, the machine may be adapted for use upon railways, and it will be seen that the power may be regulated as may be desired.

At all of the bearings I prefer to employ anti-friction devices, such as rolls.

Having thus described my invention, I claim as new and desire to secure by Letters Patent—

1. The combination, with the driving-wheels and their shaft, of a rigid frame mounted on said shaft, a driving-lever fulcrumed between its ends on said shaft, a crank-shaft in rear of the main shaft and geared thereto, and connections between the lower end of the driving-lever and the crank-shaft, substantially as set forth.

2. In a vehicle, the combination, with a rigid frame, the forward portion of which is supported by the vehicle-axle, of a driving-lever fulcrumed on the axle, a lever-bar 40, pivotally connected to the rigid frame and extending downward therefrom, a link by which the driving-lever and the lever 40 are connected, a crank-shaft carried by the rigid frame, a link connecting the crank-shaft and the lever 40, a sprocket-wheel carried by the crank-shaft, a driving belt or chain running in engagement therewith, and a sprocket-wheel carried by the axle, in connection with which the driving-belt runs, substantially as described.

3. In a vehicle, the combination, with a rigid seat-supporting frame, the forward portion of which is upheld by the vehicle-driving wheels, of a caster-wheel arranged at the rear of the driving-wheel, pedals pivotally mounted in either side of the frame and provided with downwardly-extending apertured arms 18, rods extending forward from the caster-wheel through said apertures, and springs connecting the forward ends of the pedals and the rods, substantially as described.

CLARENCE P. HOYT.

Witnesses:
  G. T. CONAWAY,
  W. A. HELM.